UNITED STATES PATENT OFFICE.

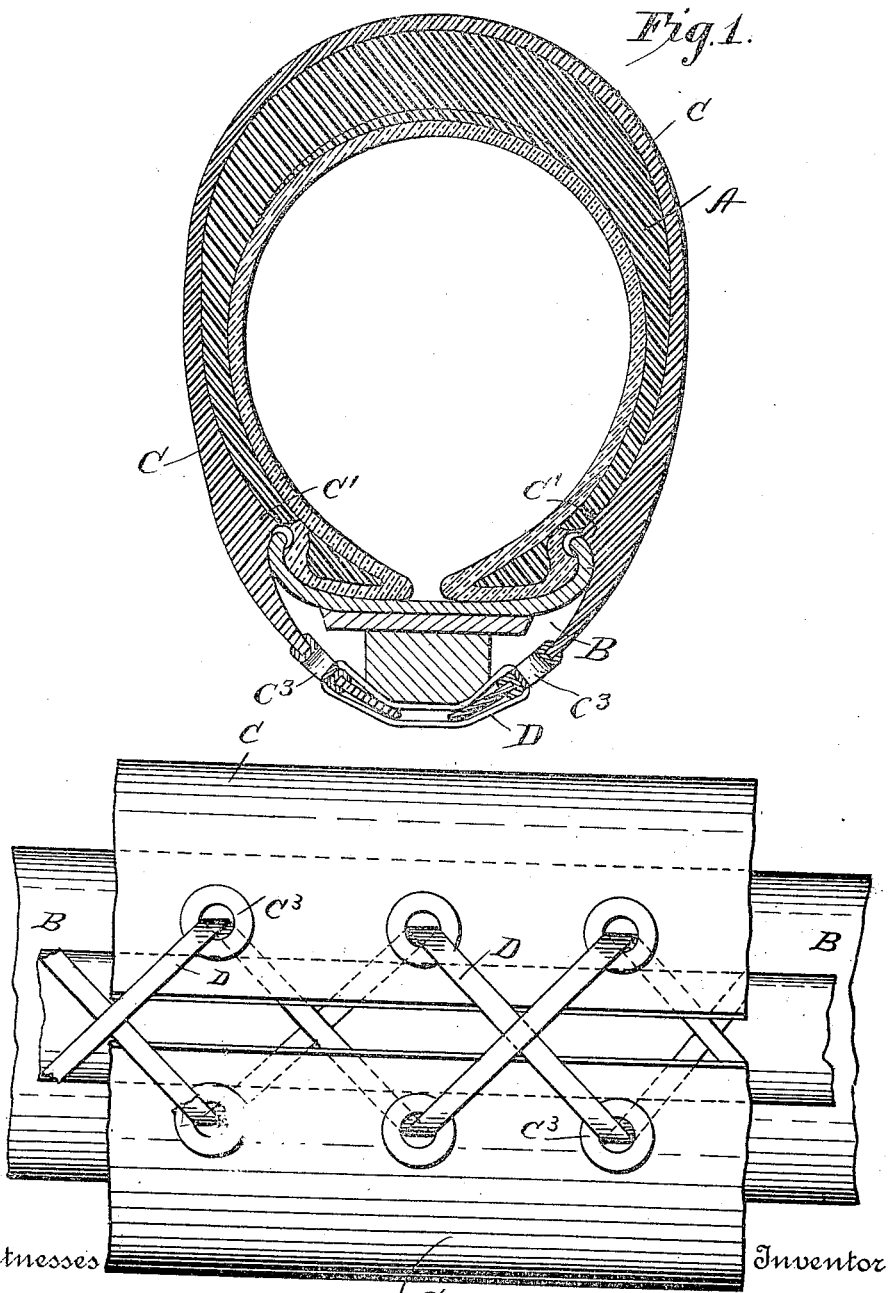

MAX D. BESSE, OF DAYTON, OHIO.

TIRE-PROTECTOR.

1,058,029. Specification of Letters Patent. Patented Apr. 8, 1913.

Application filed April 4, 1910. Serial No. 553,251.

*To all whom it may concern:*

Be it known that I, MAX D. BESSE, a citizen of the United States, residing at Dayton, in the county of Montgomery and State of Ohio, have invented certain new and useful Improvements in Tire-Protectors, of which the following is a specification.

This invention relates to detachable tire treads or protectors, designed to be readily applied to, or removed from, an ordinary pneumatic tire without displacing or otherwise affecting same.

The primary object in view is to provide a protector or cover, of any suitable material, that will entirely envelop the tire, as well as a part of the rim adjacent thereto, in such a manner as to effectively prevent the accumulation of sand or grit between the protector and the tire. To accomplish this purpose my improved protector is made to conform, identically, with the exposed surface of the inflated tire, being provided with lobes or projections near the base, at the point where the tire and rim join, and designed to completely close the interstices resulting from the irregular conformation of the tire at this point.

The purpose and nature of this invention is more fully described below and illustrated in the accompanying drawings in which;

Figure 1, illustrates in cross section a pneumatic tire and rim with my improved protector applied. Fig. 2, illustrates a plan view of a portion of my protector laced to a tire viewed from the base of said tire.

Similar letters of reference are employed to indicate corresponding parts in the several views in which:

The letter A, denotes an ordinary pneumatic tire, mounted on a rim B. The protector C, is shown in engagement with the tire and rim in the drawings.

C', are the lobes or projections designed to fit snugly into the recesses between the tire and the rim, caused by the irregular contour of the same.

The extremities of the protector C², may be reinforced with any suitable material such as canvas and the like, and serve as binders. Their function is to tightly engage the rim B, and when properly bound together by a cord D, they serve to hold the protector in permanent engagement with the tire. Eyelets C³, are provided in the uppermost extremities of the protector, and when same is adjusted to the tire and rim, the space intervening between said extremities is bridged by the cord D, in the operation known as lacing.

In applying the protector or tread the air is first let out of the tire, then the protector is adjusted into position and firmly laced together in the manner described, at which time the tire is ready to be inflated. It will be seen by this arrangement that when the tire is being inflated it will accurately adjust itself to the conformation of the protector and become, in effect, integral therewith, thus acomplishing the end in view.

Having described my invention, what I claim and desire to secure by Letters Patent is:

The combination with a pneumatic tire, and a rim securing the same, of a protective casing, portions of which at the point where the rim joins the tire, being increased in thickness to provide said casing with inner circumferential lobes which lie within the circumferential recesses on each side of the tire due to the inward curvature of the tire and the inwardly lying margins of the rim, the said protective casing being extended from said lobe portions, to inclose the rim, and whereby said tire is snugly incased throughout its exposed surface by said protective casing.

In testimony whereof I affix my signature in presence of two witnesses.

MAX D. BESSE.

Witnesses:
 LEONA. KRAMER,
 DANIEL NEVINS.